Figure 1:
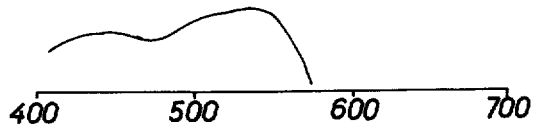
Figure 2:
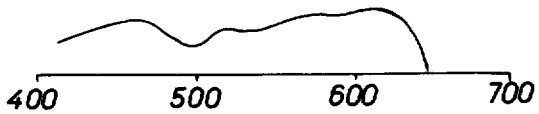
Figure 3:
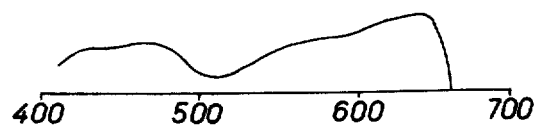
Figure 4:
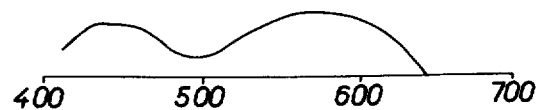

INVENTORS:
JOHANNES GÖTZE, MARIE HASE.

United States Patent Office 3,084,045
Patented Apr. 2, 1963

3,084,045
CYANINE DYES DERIVED FROM THIENYLBEN-
ZOTHIAZOLES AND SILVER HALIDE EMUL-
SIONS SENSITIZED THEREWITH
Johannes Götze, Koln-Stammheim, and Marie Hase,
Bergisch-Gladbach, Germany, assignors to Agfa Aktien-
gesellschaft, Leverkusen, Germany, a corporation of
Germany
Filed Mar. 25, 1958, Ser. No. 723,881
Claims priority, application Germany Mar. 28, 1957
9 Claims. (Cl. 96—106)

The present invention relates to new cyanine dyestuffs and to silver halide emulsions sensitized therewith.

A whole series of sensitizing dyes from the class consisting of basic cyanine dyes and the neutrocyanines or merocyanines are known for sensitizing silver halide amulsions, these dyes being derived from substituted or unsubstituted 2-methylbenzothiazoles. By suitable substitution of the benzothiazole, the properties of the dyes can be modified, so that they can be better adapted to their actual use.

Methyl groups or methoxy groups in the 6 position of the benzothiazole cause a bathochromic displacement of the absorption and sensitization maxima of the dyes produced therefrom as compared with the unsubstituted dyes; amino groups and substituted amino groups cause an even stronger bathochromic action. Substituents in the 5 position do not have such a strong action in deepening the color, and occasionally dyes obtained from such benzothiazoles have a better sensitizing action. Benzothiazoles containing phenyl radicals or halogen atoms as well as carboxyl or carbethoxy (ethoxycarbonyl) groups have also been proposed as starting materials for optical sensitizers. By substitution in the polymethine chain or by changes on the nitrogen substituent, the sensitization can be modified according to requirements. Even though a large number of dyes having a good sensitizing action is available as a result of all these modifications, the development of new types of emulsions still continues. This development, which is often carried out for quite special purposes, always places fresh demands on the dyes, for example, as regards the position of the sensitization maxima, the shape of the sensitization curve, the intensity and the behavior with respect to additives, such as color couplers. In addition, new problems continue to arise with respect to possibilities of variation of the cyanine dyes.

It has now been found that cyanine dyes, such as basic or acid cyanine dyes or neutrocyanines which are derived from benzothiazoles and which are substituted in the 5 position or 6 position by a thiophene radical are very suitable for sensitizing silver halide emulsions. These dyes substituted with thiophene are characterized by a very powerful sensitizing action which is superior to the intensity of the unsubstituted dyes or of the phenyl-substituted dyes, which are closest to the new dyes.

The dyes according to the invention may be derived from benzothiazoles substituted with thiophene radicals and of the Formulae I and II:

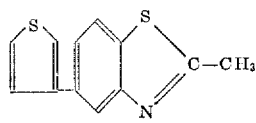

(I)

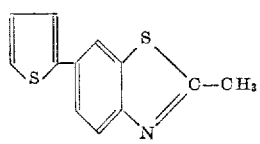

(II)

These thiophene-substituted benzothiazoles are not in the prior art. As part of the present invention, a process has been found by means of which such bases, for example, 2-methyl-5-(2-thienyl)benzothiazole (I) or 2-methyl-ϵ-(2-thienyl) benzothiazole (II), can be produced in a simple manner and with a good yield. This synthesis is carried out by reacting thiophene with diazotized 2-methyl-5-aminobenzothiazole of 2-methyl-6-aminobenzothiazole.

The bases I and II can be converted by methods known as such into quaternary salts for instance by heating with dimethyl sulphate, p-toluene sulphonic acid ethyl ester, an alkyl chloride, alkyl bromide, alkyliodide, butane sultone or other alkylating agents into quaternary salts, which, for example, have the Formula III or IV:

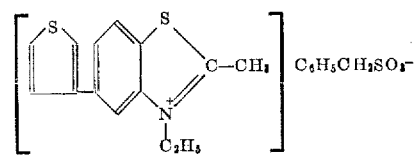

(III)

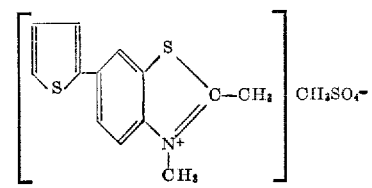

(IV)

The quaternary salts are distinguished by high reactivity and may be transformed by known methods into cyanine dyes. By way of example there are cited the following methods:

Asymmetrical 2,2'-monomethinecyanines (pseudocyanines) are obtained by condensing the above quaternary salts with quaternary salts of heterocyclic nitrogen compounds which contain an alkylmercapto, preferably a methylmercapto group in the alpha or gamma position, suitable heterocyclic nitrogen compounds being for instance substituted or unsubstituted benzothiazoles, naphthothiazoles, thiazoles, benzoselenazoles, selenazoles, benzoxazoles, naphthoxazoles, and quinolines. In addition to the alkylmercapto group the compounds may have as substituent groups one or more of the following: alkoxy, halogen, alkyl, aryl, aralkyl, amino or substituted amino. The dyes derived from alpha alkylmercapto compounds correspond to the general formula:

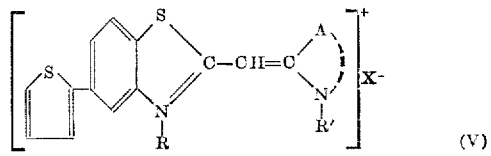

(V)

wherein

R and R' stand for a substituted or unsubstituted alkyl group such as methyl, ethyl, propyl, butyl, carboxyethyl (—CH$_2$CH$_2$—COOH)—(CH$_2$)$_n$—SO$_3$H ($n=2$, 3, 4) or —(CH$_2$)$_n$—SO$_3^-$, in case the sulfonic acid group is the anionic group, A stands for the atoms necessary to complete a heterocyclic ring as defined above, X stands for an anion, such as Cl$^-$, Br$^-$, I$^-$, ClO$_4^-$, methyl sulfate (CH$_3$SO$_4^-$) and p-toluenesulfonate (C$_6$H$_5$CH$_2$SO$_3^-$)

Symmetrical monomethinecyanines are obtained by condensing the above quaternary salts by means of amyl nitrite in glacial acetic acid.

Symmetrical carbocyanines are produced by condensing the quaternary salts with ethyl orthoformate (triethoxymethane) in pyridine solution. For obtaining asymmetrical carbocyanines that are unsubstituted in the trimethine chain the quaternary salts are condensed with quaternary salts of heterocyclic nitrogen bases of the aforementioned type which are substituted in the alpha position by an acylarylaminovinyl group such as an acetylphenylaminovinyl group. Symmetrical carbocyanines which are substituted at the middle carbon atom of the trimethine chain by an alkyl group are obtained by condensing the quaternary thienyl bases with an ortho ester of acetic acid or of a higher fatty acid such as ethyl orthoacetate (1,1,1-triethoxyethane) in pyridine solution. By condensing the above quaternary salts with quaternary salts of heterocyclic nitrogen bases which contain in alpha position a

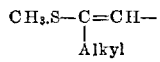

group, asymmetrical carbocyanines are obtained which are substituted in the trimethine chain by an alkyl group.

Symmetrical pentamethine-, heptamethine- and nonamethinecyanines may also be obtained from the quaternary thienyl bases by known methods such as by condensing the said bases with aniline acrolein anil (Schiff base from aniline and acrolein) solution with sodium ethoxide.

Merocyanines may be obtained by condensing the quaternary salts of the above thienylbenzothiazoles with compounds of the formula:

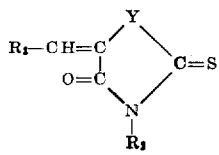

wherein $R_2$ stands for alkyl, such as methyl, ethyl, propyl, $R_3$ stands for an alkoxy or an anilino group and Y stands for oxygen or sulfur.

These merocyanines correspond to the general formula:

(VI)
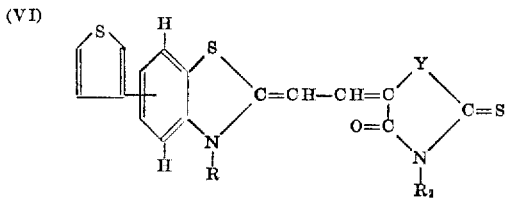

wherein R, $R_2$ and Y have the same meaning as in the preceding formulae.

These merocyanines can be quaternized by known quaternizing agents such as dimethyl sulfate, ethyl p-toluenesulfonate, and the quaternary salts may be reacted with heterocyclic nitrogen compounds having an active methyl group in alpha position to produce rhodacyanines of the following general formula:

(VII)
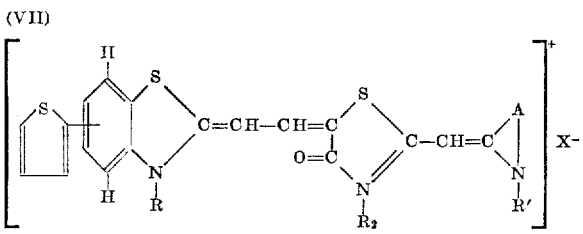

wherein R, R', $R_2$, A and X⁻ have the same meaning as in the preceding formulae.

It is furthermore possible to condense any other known quaternary merocyanine salts such as those of the formula:

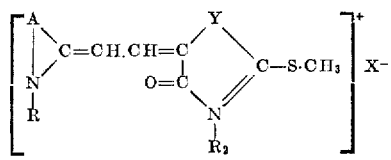

with one of the above quaternary salts of thienylbenzothiazole whereby rhodacyanines of the following formula are obtained:

(VIII)
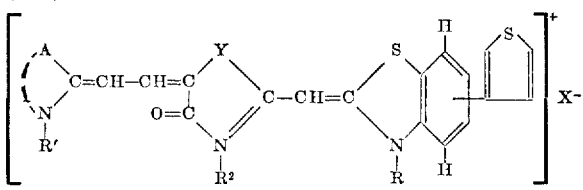

Another type of dyestuffs which may be obtained from the present quaternary salts according to known methods are the isocyanines of the formula:

(IX)
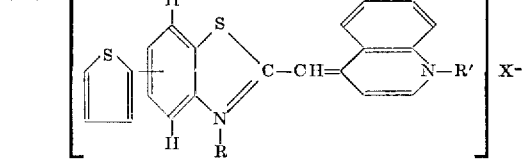

The absorption spectra of the new dyes are clearly displaced further towards the red than the corresponding known phenyl-substituted dyes and they have a much more intense color than the unsubstituted dyes, as will be seen from the following data:

Bis(3-methyl-2-benzothiazolyl)trimethine cyanine bromide: Absorption maximum 560 millimicrons Bis(3-methyl-6-phenyl-2-benzothiazolyl)trimethine cyanine bromide: Absorption maximum 580 millimicrons Bis(3 - methyl-6-(2-thienyl)-2-benzothiazolyl)trimethine cyanine bromide: Absorption maximum 590 millimicrons.

The sensitization maxima of the new dyes are correspondingly also displaced towards the longer wave range as compared with the known dyes.

The new sensitizers are suitable for black-and-white and for color silver halide emulsions and are added to said emulsions in amounts between about 0.005 and about 0.05 gram per kilogram of emulsion.

The dyes according to the invention do not show any tendency to fogging. The photographic silver halide layers sensitized therewith are stable to storage and do not show any decrease in sensitivity when kept in a heating chamber.

The present invention will now be explained by reference to the following examples.

*Example 1*

The dye of the formula

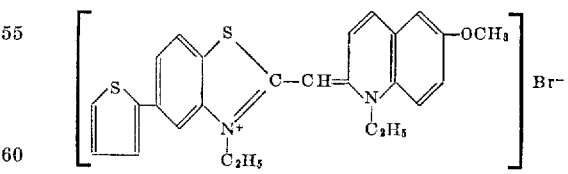

is a powerful orthochromatic sensitizer with a very high yellow and green sensitivity and is for, example, highly suitable for sensitizing black-and-white silver halide emulsion layers.

Absorption maximum 500 millimicrons, sensitivity maximum 545 millimicrons (30 mg. of dyestuff per kg. of emulsion).

*Preparation of the dye.*—75 g. of 2-methyl-5-aminobenzothiazole, prepared according to Fries, Annalen der Chemie, vol. 527, page 67, are dissolved in 180 cc. of water and 150 cc. of hydrochloric acid and diazotized at about 0° C. with a solution of 33 g. of sodium nitrite in 95 cc. of water. The diazo solution is vigorously shaken at about +6° C. with 1200 cc. of thiophene, and a solution of 200 g. of sodium acetate in 600 cc. of water is gradually added thereto. This mixture is vigorously stirred for several hours at 6° C. and then for 12 hours at room temperature.

The resulting mixture is then heated for 30 minutes on a steam bath. The thiophene fraction is separated out, washed once with water, dried and the thiophene is evaporated. The residue is distilled in vacuo. The fraction which boils at 172–173° C./1 mm. is 2-methyl-5-(2-thienyl)benzothiazole. The distillate which immediately solidifies can be again recrystallized from methanol. The new base has a melting point of 70° C. Total analysis produced the following expected values.

For a substance with the empirical formula $C_{12}H_9NS_2$, the following composition is calculated: C, 62.3%; H, 3.9%; N, 6.1%; S, 27.7%. The values found were: C, 62.2%; H, 3.9%; N, 6.2%; S, 28.0%.

1.1 g. of this 2-methyl-5-(2-thienyl)benzothiazole and 1 g. of p-toluenesulphonic acid ethyl ester are heated for 15 minutes at 125° C. in an oil bath. Without further purification, the reaction mixture has added thereto 1.7 g. of 1-ethyl-2-methyl mercapto-6-methoxy quinolinium methyl sulfate, 20 cc. of ethanol and 1 cc. of triethylamine, whereupon it is heated on the water bath and left to stand for 30 minutes at room temperature. The dye solution is then poured into a dilute potassium bromide solution, and the bromide of the dyestuff is filtered off with suction and recrystallized from ethanol.

*Example 2*

The dye of the formula

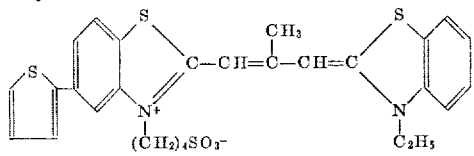

is a panchromatic sensitizer for silver bromide emulsions having a high sensitivity in the range of 620 millimicrons.

Absorption maximum 555 millimicrons, sensitivity maximum 620 millimicrons (30 mg. per kg. of emulsion).

*Preparation of the dye.*—18 g. of 2-methyl-5-thienyl benzothiazole as described in Example 1 and 11 g. of butane sultone are heated in an oil bath for one hour at 120° C. The reaction mixture is worked up with acetone. The compound thus obtained, which as the formula:

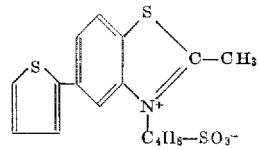

is a white powder.

3 g. of this salt and 3 g. of the following compound

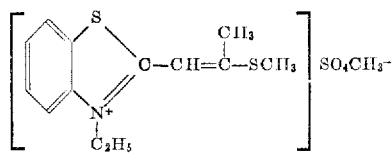

are dissolved in 70 cc. of ethanol and left to stand for 24 hours at room temperature with the addition of 2 cc. of triethylamine. The dye which separated out is filtered off with suction, washed with a little water and recrystallized from a mixture of chloroform and methanol.

*Example 3*

The dye of the formula

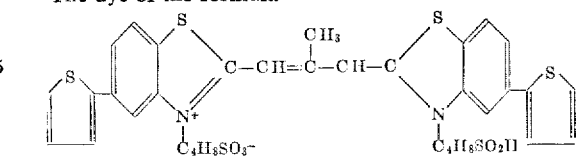

is particularly suitable for sensitizing silver halide emulsions for color photography purposes. This dye can be used for panchromatic sensitization of a color photographic silver bromoiodide emulsion (35 mg. per kg.), which can for example contain as cyan coupler 15 g. of sulfonated 1-hydroxy-2-n-octadecylaminonaphthoic acid or a coupler described in German Patents No. 726,611 or 733,407. Moreover, this panchromatic dye shows the remarkable property of a good hyper-sensitizing effect in admixture with other panchromatic dyes, for example, with those described in German patent specification No. 704,141.

*Preparation of the dye.*—11 g. of the quaternary salt of 2-methyl-5-(2-thienyl) benzothiazole and butane sultone as described in Example 2, 80 cc. of pyridine, 4 cc. of triethylamine and 10 cc. of orthopropionic ester (1,1,1-triethoxypropane) are heated for 1½ hours to boiling point. The dye formed is precipitated from the hot solution with ethanol and potassium iodide solution and recrystallized from a mixture of methanol and isopropanol.

*Example 4*

The dye of the formula

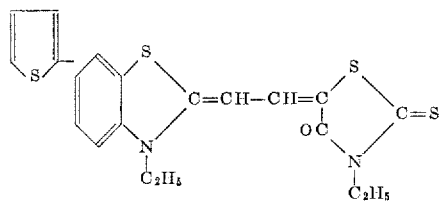

has an absorption maximum of 550 millimicrons and a sensitivity maximum of 590 millimicrons.

*Preparation of the dye.*—The 2-methyl-6-(2-thienyl)-benzothiazole necessary for synthesizing this dye is prepared in exactly the same way as explained in Example 1 for the base substituted in the 5 position with thiophene, the initial substance being 2-methyl-6-aminobenzothiazole. 2-methyl-6-(2-thienyl)-benzothiazole boils at 180° C/1.5 mm. and melts at 84–85° C. In this case as well, analysis shows the calculated values: C, 62.3%; H, 4.15%; N, 6.1%.

11 g. of this base are heated for 30 minutes at 140° C. with 10 g. of p-toluenesulphonic acid ethyl ester. The reaction product is treated with acetone, whereupon the 2-methyl-3-ethyl-6-(2-thienyl)benzothiazolium p-toluenesulfonate is obtained as a practically colorless powder.

3.1 g. of this salt and 1.4 g. of 3-ethyl-5-ethoxymethylene rhodanine are dissolved in 20 cc. of pyridine and left for 20 minutes on a steam bath. On cooling, dye crystals separate out and these are recrystallized from a mixture of methanol and chloroform.

*Example 5*

The dye of the formula

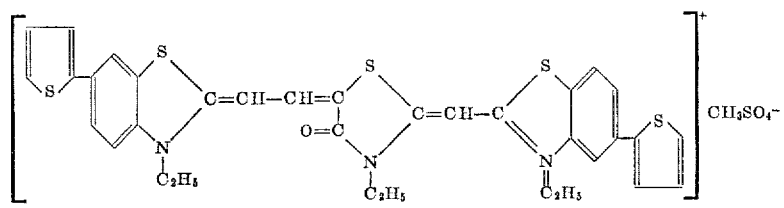

has an absorption maximum of 615 millimicrons.

*Preparation of the dye.*—1 g. of the dye obtained as described in Example 4 is heated with about ½ cc. of dimethyl sulfate for about 15 minutes at 100° C., 1 g. of 2-methyl-3-ethyl-5-(2-thienyl) - benzothiazolium ethyl

*Example 8*

A dyestuff of the formula

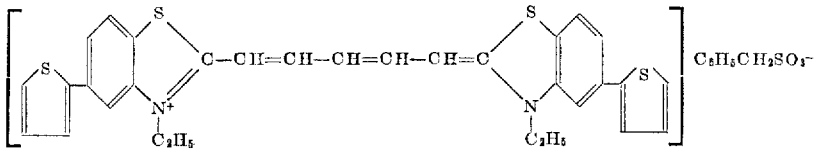

p-toluenesulphonate, 30 cc. of ethanol and 1 cc. of triethylamine are then added, and the mixture is placed for about 15 minutes on a water bath and then allowed to cool. The precipitated crude product is recrystallized several times from a large quantity of methanol.

*Example 6*

The dye of the formula

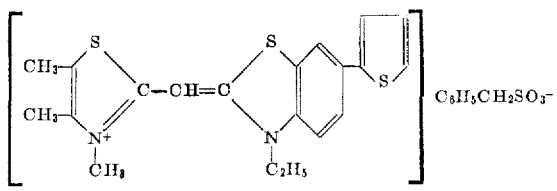

has a sensitization maximum at 460 m.

This dye is particularly suitable for sensitizing silver chlorobromide emulsions for photographic papers (25 mg. per kg. of emulsion).

*Preparation of the dye.*—4 g. of 2-methyl-3-ethyl-6-(2-thienyl)-benzothiazole p-toluenesulphonate (see Example 4) and 3 g. of 2-methylmercapto-3,4,5-trimethylthiazole methyl sulfate are dissolved in 35 cc. of pyridine, the mixture is brought to the boiling point, and then 2 cc. of piperidine are added and the mixture allowed to cool. The dye crystallizes out from the greenish colored solution. It is filtered off with suction and recrystallized from methanol.

*Example 7*

The dye of the formula

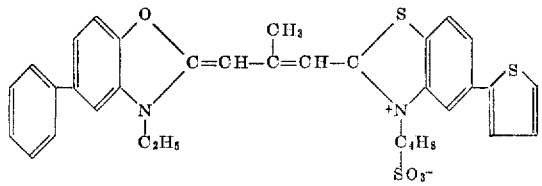

is particularly suitable for sensitizing orthochromatic silver bromoiodide emulsions for color photographic purposes.

Absorption maximum 538 millimicrons; sensitization maximum 570 millimicrons (35 mg. per kg. of emulsion).

It has a high sensitivity in the yellow and yellowish-green range of the spectrum. The dye emulsions sensitized therewith can, for example, contain magenta components as described in German Patents Nos. 726,611 and 733,407, which couple with the oxidation products of primary aromatic amine developers to produce magenta dyestuffs.

*Preparation of the dye.*—3 g. of the inner salt of 2-methyl-5-(2-thienyl)benzothiazole and butane sultone as described in Example 2 and also 3 g. of a reaction product of 2-methyl-5-phenyl-benzoxazole and ethyl isothioacetanilide, obtained as described in German Patent No. 637,113, are boiled for 1½ hours in 30 cc. of pyridine. The mixture is then allowed to cool slightly, any initial materials which have not reacted are filtered off and about the same volume of methanol and water is added to the deep red filtrate. After some hours, the dye starts to separate out, and this can be recrystallized from a mixture of methanol and chloroform for purification purposes.

sensitizes a silver halide emulsion with a maximum at 720 millimicrons (6 mg. per kg. of emulsion). The layers obtained from such emulsions are distinguished by their freedom from tendencies of fog and their high sensitivity.

*Preparation of the dye.*—1 g. of the quaternary salt of 2-methyl-5-(2-thienyl) benzothiazole disclosed in Example 1 is heated to the boil for 2 minutes together with 6 cc. of pyridine and 0.5 cc. of the acetal of 2-ethoxyacrolein. The dyestuff crystallizes after a short time and is recrystallized from methanol.

Figure 5:
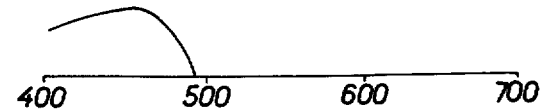
Figure 6:
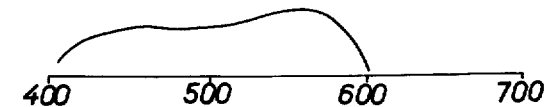
Figure 7:

In the accompanying drawing the sensitization curves of the dyestuffs disclosed in the examples are illustrated. FIGURES 1 to 4 corresponds to the dyestuffs of Examples 1 to 4 and FIGURES 5 to 7 correspond to the dyestuff of Examples 6 to 8.

We claim:

1. A light-sensitive silver halide photographic emulsion optically sensitized with an effective amount of a cyanine dye of the group represented by the following formulae:

(I) (a)

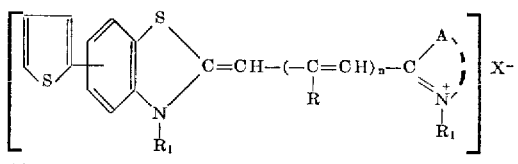

(b)

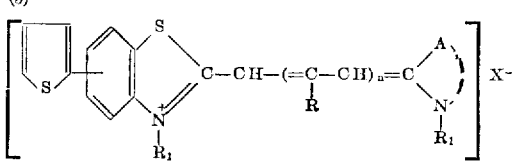

(II)

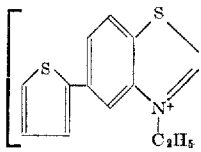

(III) (a)

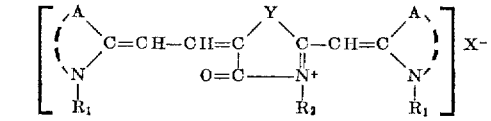

(b)

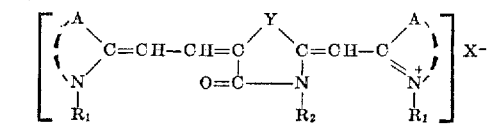

in which $n$ is an integer from 0 to 4,

R is a radical of the group consisting of hydrogen and methyl, $R_1$ is a radical of the group consisting of lower alkyl, carbonyl-substituted lower alkyl, and sulfo-substituted lower alkyl, $R_2$ is a lower alkyl radical, $X^-$ is an anion of the group consisting of chloride, bromide, iodide, perchlorate, methylsulfate, and p-toluenesulfonate, Y is a radical of the group consisting of oxygen and sulfur, and A represents the atoms necessary to complete a heterocyclic ring of the group consisting of benzothiazoles, naphthothiazoles, thiazoles, benzoselenazoles, selenazoles, benzoxazoles, naphthoxazoles, and quinolines, at least one of which, in Formula IIIa and IIIb, is a ring of the group consisting of 5-(2-thienyl)benzothiazole and 6-(2-thienyl)benzothiazole.

2. A silver halide photograph emulsion as defined in claim 1 in which the cyanine dye has the formula

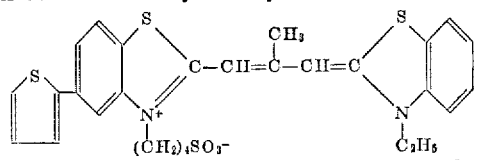

3. A silver halide photograph emulsion as defined in claim 1 in which the cyanine dye has the formula

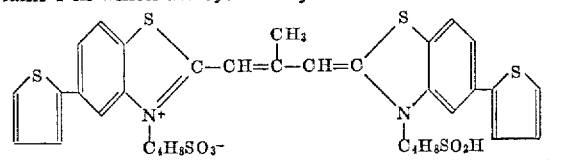

4. A silver halide photograph emulsion as defined in claim 1 in which the cyanine dye has the formula

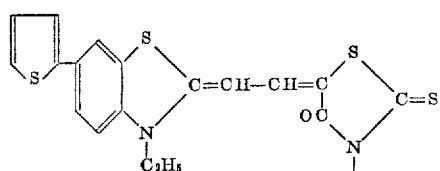

5. A silver halide photograph emulsion as defined in claim 1 in which the cyanine dye has the formula

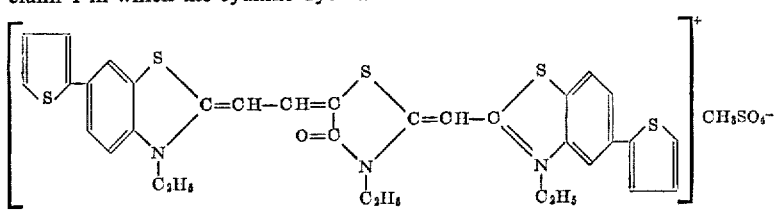

6. A silver halide photograph emulsion as defined in claim 1 in which the cyanine dye has the formula

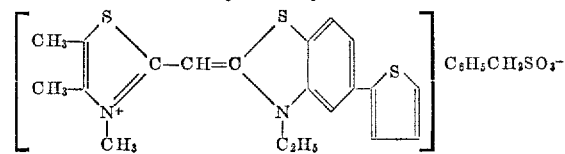

7. A silver halide photograph emulsion as defined in claim 1 in which the cyanine dye has the formula

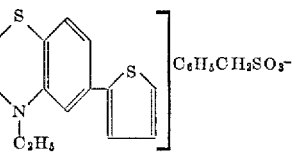

8. A silver halide photographic emulsion as defined in claim 1 in which the cyanine dye has the formula:

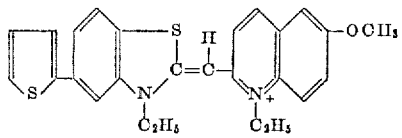

9. A silver halide photographic emulsion as defined in claim 1 in which the cyanine dye has the formula:

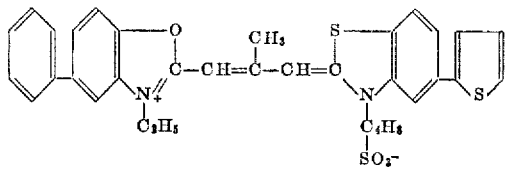

References Cited in the file of this patent

UNITED STATES PATENTS

| | | |
|---|---|---|
| 2,060,383 | Schneider | Nov. 10, 1936 |
| 2,065,412 | Zeh | Dec. 22, 1936 |
| 2,104,064 | Zeh | Jan. 4, 1938 |
| 2,233,873 | Rogers et al. | Mar. 4, 1941 |
| 2,278,461 | Middleton | Apr. 7, 1942 |
| 2,395,879 | Kendall et al. | Mar. 5, 1946 |
| 2,415,927 | Anish | Feb. 18, 1947 |
| 2,525,015 | Beersmans | Oct. 10, 1950 |
| 2,610,190 | Chao et al. | Sept. 9, 1952 |
| 2,715,629 | Zwilgmeyer | Aug. 16, 1955 |
| 2,930,694 | Coenen et al. | Mar. 29, 1960 |

OTHER REFERENCES

Chemical Abstracts, 16, 3101 (abstract of Brit. Med. Journal, 1922, I, 514–515).

Chemical Abstracts, 19, 530 (abstract of Proc. Roy. Soc., London, 96B, 317-33, 1924).

UNITED STATES PATENT OFFICE
CERTIFICATE OF CORRECTION

Patent No. 3,084,045                                          April 2, 1963

Johannes Götze et al.

It is hereby certified that error appears in the above numbered patent requiring correction and that the said Letters Patent should read as corrected below.

Column 1, lines 60 to 65, column 2, lines 15 to 21, and column 3, lines 40 to 46, in each of the structural formulae I, III, and VI, for the portion reading 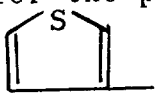 read 

column 6, Example 3, lines 3 to 9, and column 9, in claim 3, lines 28 to 33, for that portion of the formula reading:

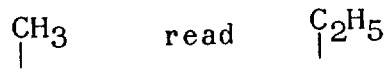

column 6, Example 3, lines 3 to 9, and column 9, in claim 3, lines 28 to 33, for that portion of the formula reading:

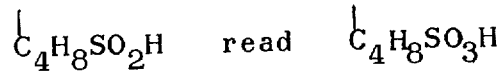

Signed and sealed this 19th day of November 1963.

(SEAL)
Attest:
ERNEST W. SWIDER
Attesting Officer

EDWIN L. REYNOLDS

Acting Commissioner of Patents